(12) United States Patent
Kurma Raju et al.

(10) Patent No.: US 11,551,891 B2
(45) Date of Patent: Jan. 10, 2023

(54) KEYBOARD THAT INCLUDES SHAPE MEMORY MATERIAL

(71) Applicant: Intel Corporation, Santa Clara, CA (US)

(72) Inventors: Prakash Kurma Raju, Bangalore (IN); Raghavendra Doddi, Bangalore (IN); Prasanna Pichumani, Bangalore (IN); Sachin Bedare, Bangalore (IN); Bijendra Singh, Bangalore (IN); Gopinath Kandasamy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 16/455,576

(22) Filed: Jun. 27, 2019

(65) Prior Publication Data

US 2019/0326081 A1    Oct. 24, 2019

(51) Int. Cl.
*H01H 13/84* (2006.01)
*H01H 13/705* (2006.01)
*G06F 1/16* (2006.01)

(52) U.S. Cl.
CPC ........... *H01H 13/84* (2013.01); *G06F 1/1662* (2013.01); *H01H 13/705* (2013.01); *G06F 1/1616* (2013.01); *H01H 2215/00* (2013.01); *H01H 2235/01* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 3/84
See application file for complete search history.

(56) References Cited

U.S. PATENT DOCUMENTS

| | | | | |
|---|---|---|---|---|
| 10,115,542 B1* | 10/2018 | Tsai | ...................... | H01H 13/705 |
| 2003/0095690 A1* | 5/2003 | Su | ............................ | G06F 21/32 |
| | | | | 382/124 |
| 2008/0182228 A1* | 7/2008 | Hafez | ................... | G09B 21/004 |
| | | | | 434/114 |
| 2011/0011712 A1* | 1/2011 | Klinghult | .............. | G06F 3/0362 |
| | | | | 200/341 |
| 2016/0071666 A1* | 3/2016 | Hao | .................... | H01H 13/7057 |
| | | | | 29/622 |

* cited by examiner

Primary Examiner — Ahmed M Saeed
(74) Attorney, Agent, or Firm — Patent Capital Group (57) ABSTRACT

Particular embodiments described herein provide for an electronic device that can include a key height activation engine and a keyboard. The keyboard can include a plurality of keys and one or more of the plurality of keys can include a key height mechanism. The key height mechanism includes a shape memory material and when the key height mechanism is activated by the key height activation engine, the shape memory material raises the one or more of the plurality of keys that includes the key height mechanism from a first height to a second height.

20 Claims, 9 Drawing Sheets

KEYBOARD THAT INCLUDES SHAPE MEMORY MATERIAL

TECHNICAL FIELD

This disclosure relates in general to the field of computing and/or device cooling, and more particularly, to a keyboard that includes shape memory material.

BACKGROUND

Emerging trends in systems place increasing demands on a system. One trend is thin or ultra-thin devices. Traditionally, keyboard configurations fail to offer an acceptable user experience as they can be too thick. Typing on glass is ergonomically uncomfortable and current Bluetooth keyboards can be thick and cumbersome for carrying from place to place. Those designs can increase the overall thickness of an electronic device, stifle the user's flexibility, and/or hindering the overall consumer experience of the electronic device.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a keyboard that includes shape memory material. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers.

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1A:
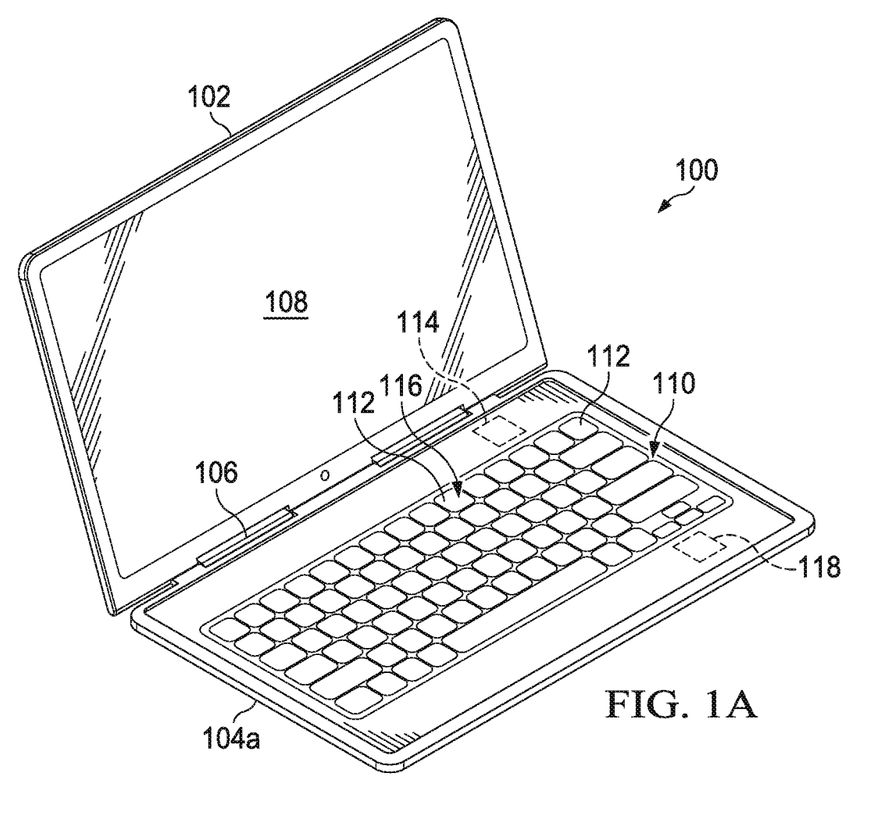
FIG. 1A is a simplified block diagram of an electronic device that includes a keyboard that includes shape memory material, in accordance with an embodiment of the present disclosure.
Figure 1B:
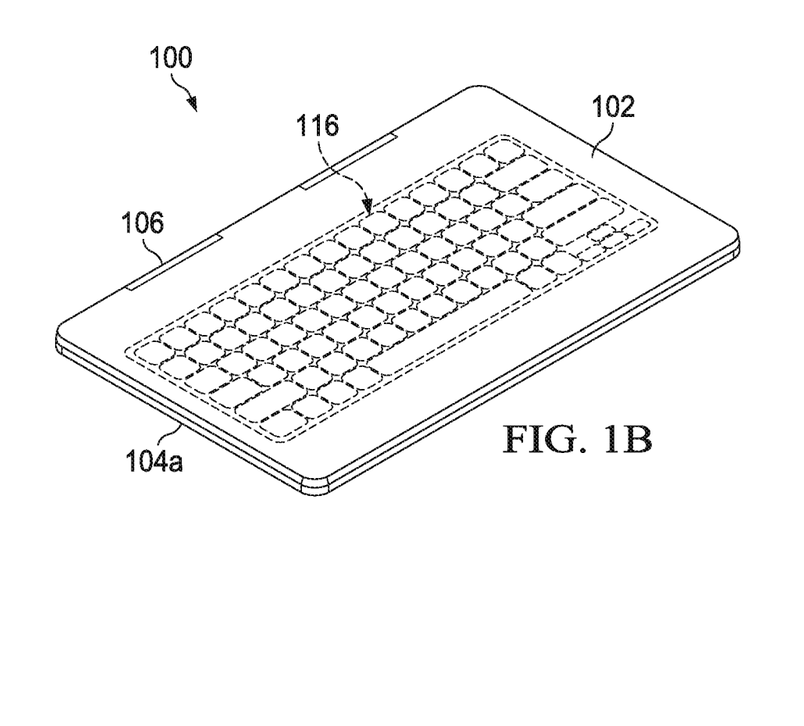
FIG. 1B is a simplified block diagram of an electronic device that includes a keyboard that includes shape memory material, in accordance with an embodiment of the present disclosure.

FIGS. 1A and 1B illustrate a simplified block diagram of an electronic device 100 configured with a keyboard that includes shape memory material, in accordance with an embodiment of the present disclosure. In an example, electronic device 100 can include a first housing 102 and a second housing 104a. A hinge 106 can rotatably couple first housing 102 to second housing 104a. First housing 102 can include a display 108.

Second housing 104a can include a keyboard 110 and a key height activation engine 114. Keyboard 110 can include a plurality of keys 112. One or more of plurality of keys 112 can include a key height mechanism 116. In an example, each key 112 in keyboard 110 includes key height mechanism 116. In other examples, a majority of keys 112 in keyboard 110 include key height mechanism 116 or keyboard 110 includes some other configuration of keys 112 in keyboard 110 that include key height mechanism 116. In some examples, second housing 104a or keyboard 110 can include a key height activator 118. Key height activation engine 114 can be configured to activate or deactivate key height mechanism 116 to raise or lower a specific key 112 that includes a corresponding key height mechanism 116. Key height activator can be configured to send a signal to key height activation engine 114 to cause key height activation engine 114 to activate or deactivate key height mechanism 116

As illustrated in FIG. 1A, key height activation engine 114 activated key height mechanism 116 and keys 112 in keyboard 110 have been raised to enable a user to use keys 112. In an example, key height activation engine 114 can activate key height mechanism 116 upon the detection of the presence of a user and/or a user authentication event. Once activated, key height mechanism 116 can raise a specific key 112 or keys 112 that includes a corresponding key height mechanism 116 to a user preferred typing height (e.g., above one (1) millimeter (mm)). More specifically, in some examples, key height activation engine 114 can activate key height mechanism 116 when first housing 102 is rotated on hinge 106 to convert electronic device 100 from a closed clamshell configuration to an open configuration. In other examples, key height activation engine 114 can activate key height mechanism 116 when one or more specific keys in keyboard 110 are pressed (e.g., entering a passcode, etc.), electronic device 100 is powered ON, etc. In still other examples, if key height activator 118 is present, when key height activator 118 is activated, key height activator 118 can cause key height activation engine 114 to activate key height mechanism 116. Key height activator 118 may be activated by a user authentication event (e.g., a biometric scan such as a finger print scan or facial recognition scan), by pressure from the user such as a finger press, by detection of light when first housing 102 is rotated on hinge 106 to convert electronic device 100 from a closed clamshell configuration to an open configuration, etc. In a specific example, key height activator 118 is a biometric scanner and can cause key height activation engine 114 to activate key height mechanism 116 upon authentication of the user.

As illustrated in FIG. 1B, key height activation engine 114 de-activated key height mechanism 116 and keys 112 in keyboard 110 have been lowered to allow keyboard 110 to have a relatively thin profile (e.g., less than one (1) mm). For example, when first housing 102 is rotated on hinge 106 to convert electronic device 100 from an open configuration to a closed clamshell configuration, key height activation engine 114 can de-activate key height mechanism 116 and keys 112 in keyboard 110 can been lowered and allow electronic device 100 to have a relatively thin profile. Key height activation engine 114 can de-activated key height mechanism 116 based on the activation of a standby mode, a hibernation mode, a shutdown event, a log-off, user absence/inactivity detection, entry into a non-keyboard mode (e.g., changing to a tablet mode, tent mode), etc. In an illustrative example, when key height mechanism 116 is de-activated and key(s) 112 are lowered, the "Z" thickness of keyboard 110 can be reduced by about one (1) mm to about 1.2 mm as compared to when key height mechanism 116 is activated and key(s) 112 are raised. The term "Z thickness" and "Z height" refer to the height along the "Z" axis of an (x, y, z) coordinate axis or cartesian coordinate system.

Figure 1C:
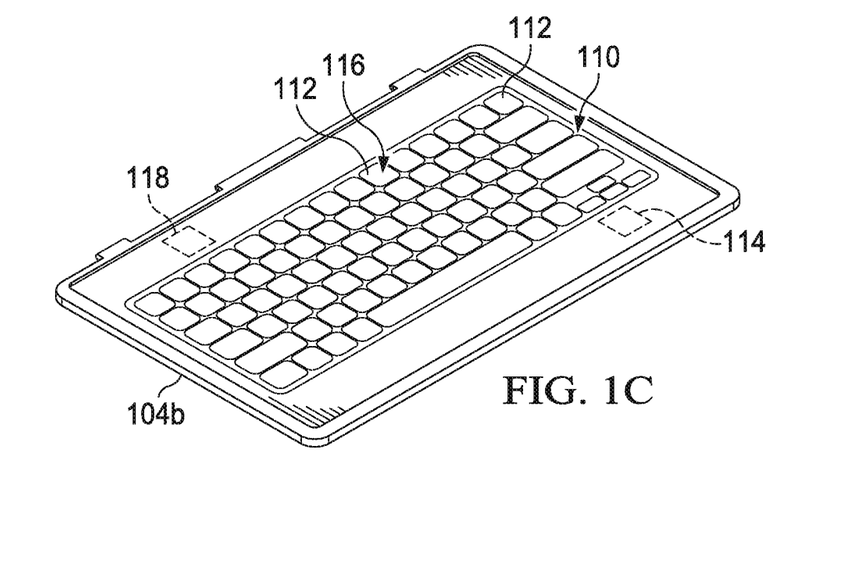
FIG. 1C is a simplified block diagram of an electronic device that includes a keyboard that includes shape memory material, in accordance with an embodiment of the present disclosure.

Turning to FIG. 1C, FIG. 1C illustrates second housing 104b. Second housing 104b may be a standalone keyboard (e.g., a Bluetooth keyboard, wireless keyboard, etc.) Second housing 104b can include keyboard 110. Keyboard 110 can include plurality of keys 112. One or more of plurality of keys 112 can include key height mechanism 116. Second housing 104b or keyboard 110 can also include key height activation engine 114. In some examples, second housing 104b or keyboard 110 may include key height activator 118. Key height activation engine 114 can be configured to activate or deactivate key height mechanism 116 to raise or lower a specific key 112 or keys 112 that includes a corresponding key height mechanism 116. For example, key height activation engine 114 can activate key height mechanism 116 to raise keys 112 in keyboard 110 and to enable a user to use keys 112. In some examples, key height activation engine 114 can activate key height mechanism 116 when second housing 104b is connected to an electronic device (e.g., when second housing 104b is wirelessly connected to a tablet), when second housing 104b is powered ON, etc. In other examples, key height activation engine 114 can activate key height mechanism 116 when one or more specific keys in keyboard 110 are pressed (e.g., entering a passcode, etc.), etc. In still other examples, if key height activator 118 is present, when key height activator 118 is activated, key height activation engine 114 can activate key height mechanism 116. Key height activator 118 may be activated by a user authentication even (e.g., a biometric scan such as a finger print scan or facial recognition scan), by pressure from the user such as a finger press, etc. Key height activation engine 114 can de-activated key height mechanism 116 to lower keys 112 in keyboard 110 and allow second housing 104b to have a relatively thin profile. Key height activation engine 114 can de-activated key height mechanism 116 based on the activation of a standby mode, a hibernation mode, a shutdown event, log-off, user absence/inactivity detection, entry into a non-keyboard mode (e.g., storage mode), etc.

In an example, key height mechanism 116 can include shape memory material to help raise or lower keys 112 in keyboard 110. Key height activation engine 114 can be configured to activate or de-active the shape memory material to help raise or lower keys 112 in keyboard 110 that include key height mechanism 116. When heat or an electrical current is applied to key height mechanism 116, the shape memory material in key height mechanism 116 changes shape and raises keys 112 in keyboard 110. One type of shape memory material that can be in included in key height mechanism 116 is Nickel-Titanium alloy ("Nitinol"), however other shape memory materials may also be used in key height mechanism 116.

It is to be understood that other embodiments may be utilized and structural changes may be made without departing from the scope of the present disclosure. Substantial flexibility is provided in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. Further, the appearances of the phrase "in one example" or "in an example" are not necessarily all referring to the same examples.

For purposes of illustrating certain example techniques, the following foundational information may be viewed as a basis from which the present disclosure may be properly explained. End users have more media and communications choices than ever before. A number of prominent technological trends are currently afoot and one trend is designing thin electronic devices, more specifically, thin or ultra-thin laptop systems and keyboards with a relatively low "Z" thickness. Key travel is one of the biggest driving factors in system "Z" thickness increases. Approximately 40% of the keyboard thickness is from the key travel distance. Based on user experience studies, about one (1) mm to about 1.2 mm key travel is an ergonomically accepted travel distance and it is not preferred go less than about one (1) mm because the user may have an undesirable or poor typing experience. Currently, there are keyboards with rubber dome and magnetic levitated keyboards but these systems do not provide a reduced "Z" thickness when not in use as they have a fixed key travel length. What is needed is a system to reduce the keyboard "Z" thickness without reducing the key travel.

A system to enable a keyboard that includes shape memory material, as outlined in FIG. 1, can resolve these issues (and others). In an example, a keyboard that includes shape memory material can be constructed using a shape memory material. The shape memory material can reduce the key height when the keys are not in use and then when activated, raise the key height to provided increased key travel when the key is pressed by a user. In a specific example, the shape memory material can reduce the keyboard "Z" thickness to below about one (1) mm when the keys are not in use then raise the keys so the key travel is not below about one (1) mm when the keys are in use.

In an example, a keyboard (e.g., keyboard 110) can include a plurality of keys (e.g., keys 112). One or more of the keys can include a key height mechanism (e.g., key height mechanism 116). A key height activation engine (e.g., key height activation engine 114) can be configured to activate or deactivate the key height mechanism to raise or lower a specific key that includes a corresponding key height mechanism. The key height mechanism can include shape memory material to help raise or lower the specific key. More specifically, the shape memory material may be included in an actuator that can raise the specific key when the shape memory material is activated and lower the specific key when the shape memory material is de-activated. The activation of the shape memory material can raise the key such that the key travel is above about one (1) mm when the keys are in use. The de-activation of the shape memory material can lower the key to reduce the keyboard "Z" thickness. In some examples, the keyboard "Z" thickness is reduced to below about one (1) mm when the keys are not in use. In an illustrative example, when the shape memory material is de-activated and the keys are lowered, the keyboard "Z" thickness can be reduced by about one (1) mm to about 1.2 mm as compared to when the shape memory material is activated and the keys are raised.

The key height activation engine can activate the key height mechanism and raise the keys based on the detection of user presence and/or a user authentication event. More specifically, in some examples, the key height activation engine can activate the key height mechanism when a user rotates first housing on a hinge to convert the electronic device from a closed clamshell configuration to an open configuration. In other examples, the key height activation engine can activate the key height mechanism when one or more specific keys in the keyboard are pressed (e.g., entering a passcode, etc.), the electronic device is powered ON, etc. In still other examples, if a key height activator is present (e.g., key height activator 118), the key height activation engine can activate key height mechanism when the key height activator is activated. The key height activator may be activated by a user authentication event (e.g., a biometric scan such as a finger print scan or facial recognition), by pressure by the user such as a finger press, detection of light, etc. The key height activation engine can de-activate the key height mechanism and lower the keys based on the activation of a standby mode, a hibernation mode, a shutdown event, log-off, user absence/inactivity detection, entry into a non-keyboard mode like a device to a tablet or tent mode, etc. The key height activator may be deactivation by the user (e.g., a finger press) or by some other means such as mechanical, electrical, magnetic, etc. contact with a first housing when the electronic device is converted to a clamshell configuration or a cover or lid when the electronic device is converted to a storage mode.

In a specific example, key height mechanism may be a cantilever actuator that includes shape memory material located under the keycaps of one or more keys. In another specific example, the shape memory material can be located under conical springs under each keycap of a key and the shape memory material can be connected to the already existing electrical circuit in the baseplate of the keyboard. In an illustrative example, when a user opens a laptop that includes the key height mechanism and converts the laptop from a closed configuration to an open configuration, switches on the power button, activates key height activator, or otherwise cause key height activation engine to activate key height mechanism, electrical signals can pass through the circuit in the baseplate and induce a temperature change on the shape memory material. The induced temperature change in shape memory material can activate the shape memory material to lift or raise the keys in the keyboard and increase the "Z" height of the keys in the keyboard so the keyboard will be ready for a desired typing experience by the user. When the shape memory material is de-activated, the keys will lower back to their original position and the keyboard thickness can be reduced by about one (1) mm to about 1.2 mm.

In another specific example, key height mechanism may be two coiled springs, a first coiled spring and a second coiled spring that each include shape memory material, and the two coiled springs can be located under the keycaps of the one or more keys. The first coiled spring (e.g., first shape memory material spring 136 illustrated in FIGS. 4A and 4B) is fixed only at the bottom of the keycap and the second coiled spring (e.g., second shape memory material spring 138 illustrated in FIGS. 4A and 4B) is fixed at the bottom of the keycap and at the base of the keyboard (e.g., the baseplate of the keyboard). In addition, to the coiled springs that include the shape memory material, a third coiled spring may be present to help with tactile feedback of the key.

The purpose of the two coiled springs is to help reduce power consumption. More specifically, key height activation engine can activate the first coiled spring by causing a current to induce a temperature change in the first coiled spring. The activation of the first coiled spring causes the first coiled spring to expand and the specific keycap associated with the first coiled spring to raise. Once the keycap has risen to the desired height, the keycap is ready for use by a user and key height activation engine can cause the current being delivered to the first coiled spring to be deactivated. The third coiled spring can keep the keycap in the desired position and can act as a keyboard actuator for tactile feedback. When the keycap needs to be lowered, key height activation engine can activate the second coiled spring by causing a current to induce a temperature change in the second coiled spring. The activation of the second coiled spring causes the second coiled spring to compress and the keycap to be drawn down or lowered. Once the keycap is lowered to the desired height, key height activation engine can cause the current being delivered to the second coiled spring to be deactivated and the keycap can remain at the lowered height. In some examples, the keys may be held at the lowered height by a pressure fit or some mechanical or magnetic means that can hold the keycap at the lowered height until the first coiled spring is activated and the keycap is raised.

The temperature at which the shape memory material is activated can be set at a desired temperature by changing the material formulation of the shape memory material. The response time of shape memory material can be customized and trained as per user requirements. For example, if the shape memory material response time is about one (1) second to about 1.5 seconds, the raising of the keycaps will not touch the display and interfere with an electronic device being converted from a closed configuration to an open configuration. By including the shape memory material under the keycaps of the keys in the keyboard, the system can reduce the keyboard thickness when the keys are not in use and activate the shape memory material to raise the keycaps and achieve desired key travel when the keys are in use.

In an example implementation, electronic device 100 is meant to encompass a computer, keyboard, a personal digital assistant (PDA), a laptop or electronic notebook, a cellular telephone, an IP phone, network elements, network appliances, servers, routers, switches, gateways, bridges, load balancers, processors, modules, or any other device, component, element, or object that includes a keyboard, especially a laptop computer. Electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100 may include virtual elements.

In regards to the internal structure, electronic device 100 can include memory elements for storing information to be used in the operations outlined herein. Electronic device 100 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

Additionally, electronic device 100 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2A:
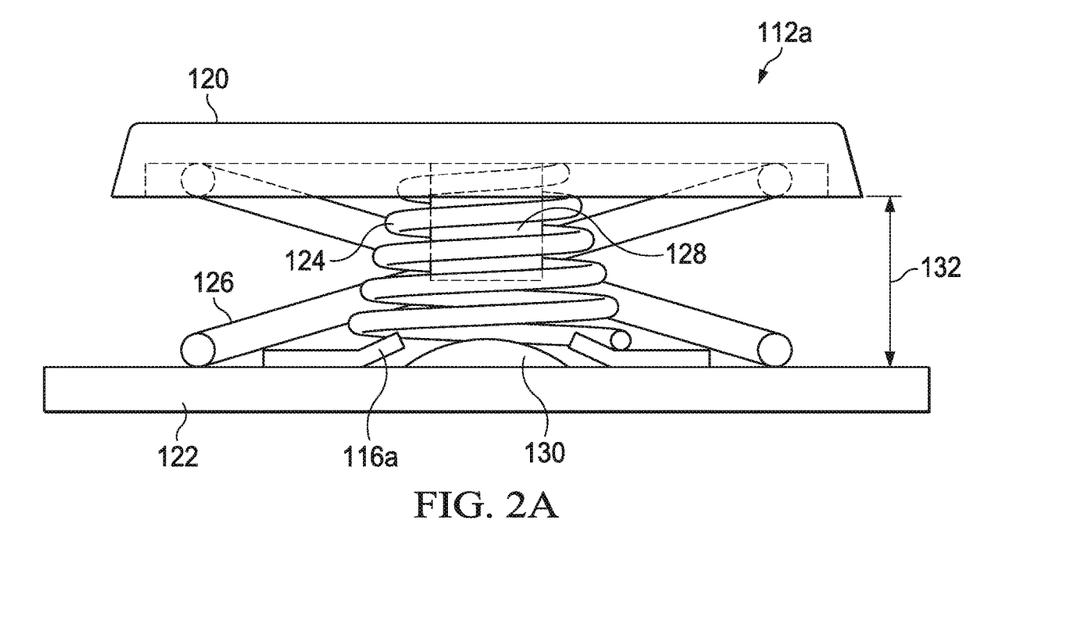
FIG. 2A is a simplified block diagram of a portion of an electronic device that includes a keyboard that includes shape memory material, in accordance with an embodiment of the present disclosure.

Turning to FIG. 2A, FIG. 2A is a simplified block diagram of a key 112a. Keyboard 110 can include one or more keys 112a. As illustrated in FIG. 2A, key 112a can include a key height mechanism 116a, a keycap 120, a baseplate 122, a key spring 124, a scissor mechanism 126, a key peg 128, and a key dome 130. Key spring 124 can act as keyboard actuators for tactile feedback when key 112a is pressed. Scissor mechanism 126 provides support and stability for key 112a and may also provide tactile feedback when key 112a is pressed. When key 112a is raised and keycap 120 of key 112a is pressed, key peg 128 comes into contact with key dome 130 and the key press is registered by baseplate 122. When key 112a is not raised, key peg 128 may be in contact with key dome 130 but a key press will not be registered by baseplate 122 or a key press is registered by baseplate 122 but the key press is not registered, is ignored, or is otherwise disregarded by the system. Baseplate 122 includes the circuitry that carries the signal generated when a key press is registered and carries the signal to activate key height mechanism 116a.

Key spring 124 can couple with key height mechanism 116a and keycap 120. As illustrated in FIG. 2A, when key height mechanism 116a is activated, key height mechanism 116a will have a bend or curve that raises key spring 124. Because key spring 124 is under keycap 120, when key spring 124 is raised, key spring 124 raises keycap 120 to an active key height 132. In an example, active key height 132 may be over about one (1) mm. In a specific example, active key height 132 may be about one (1) mm to about two (2) mm.

Figure 2B:
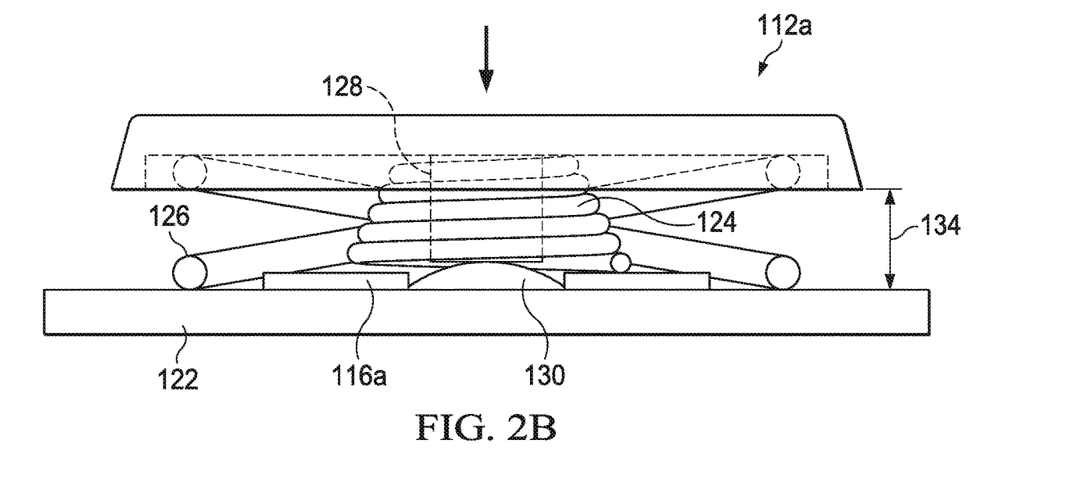
FIG. 2B is a simplified block diagram of a portion of an electronic device that includes a keyboard that includes shape memory material, in accordance with an embodiment of the present disclosure.

Turning to FIG. 2B, FIG. 2B is a simplified block diagram of key 112a. As illustrated in FIG. 2B, key height mechanism 116a has been de-activated and has a relatively flat profile. When key height mechanism 116a is de-activated and has a relatively flat profile, key spring 124 is lowered from the position illustrated in FIG. 2A. Because key spring 124 is under keycap 120, when key spring 124 is lowered, key spring 124 lowers keycap 120 to an inactive key height 134. In a specific example, inactive key height 134 may be less than about one (1) mm. When key 112a is not raised, key peg 128 may be in contact with key dome 130 but a key press will not be registered by baseplate 122 or a key press is registered by baseplate 122 but the key press is not registered, is ignored, or is otherwise disregarded by the system.

Figure 3A:
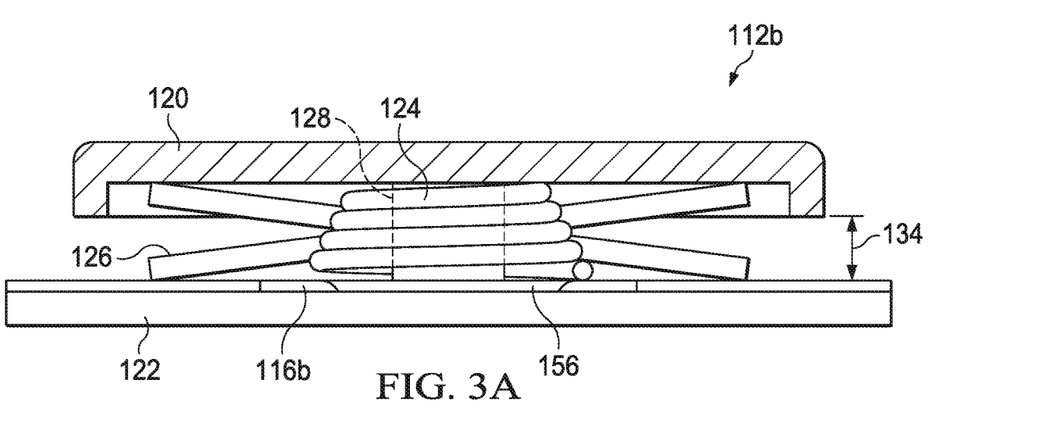
FIG. 3A is a simplified block diagram of a portion of an electronic device that includes a keyboard that includes shape memory material, in accordance with an embodiment of the present disclosure.

Turning to FIG. 3A, FIG. 3A is a simplified block diagram of a key 112b. Keyboard 110 can include one or more keys 112b. As illustrated in FIG. 3A, key 112b can include a key height mechanism 116b, keycap 120, baseplate 122, key spring 124, scissor mechanism 126, key peg 128, and key press detection means 156. When key height mechanism 116b is de-activated, key height mechanism 116b has a relatively flat profile and the distance between keycap 120 and baseplate 122 is inactive key height 134.

Figure 3B:
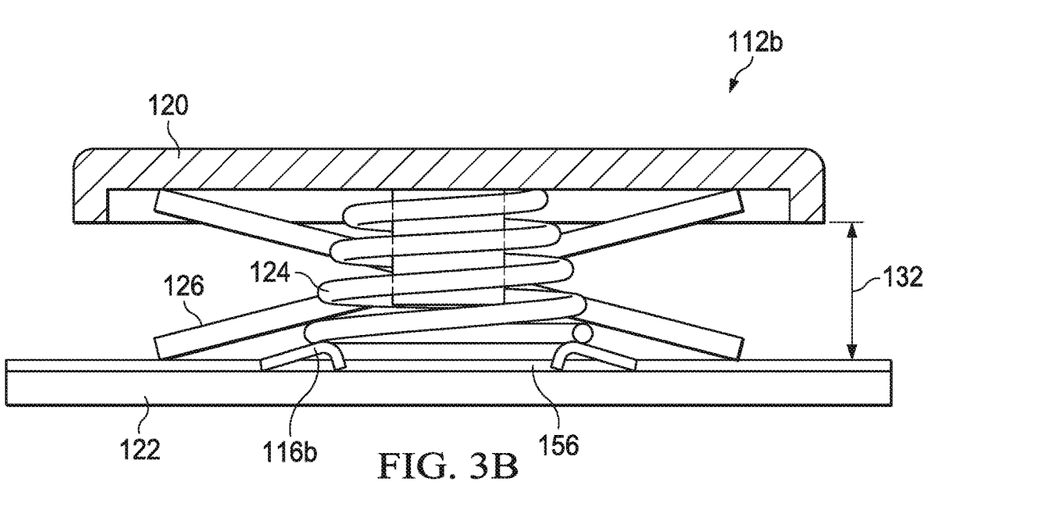
FIG. 3B is a simplified block diagram of a portion of an electronic device that includes a keyboard that includes shape memory material, in accordance with an embodiment of the present disclosure.

Turning to FIG. 3B, FIG. 3B is a simplified block diagram of key 112b. As illustrated in FIG. 3B, key height mechanism 116b has been activated. When key height mechanism 116b is activated, key height mechanism 116b will have a hook or candy cane profile that raises key spring 124. Because key spring 124 is under keycap 120, when key spring 124 is raised, key spring 124 raises keycap 120 to an active key height 132. When key 112b is raised and keycap 120 of key 112b is pressed, key peg 128 comes into contact with key press detection means 156 and key press detection means 156 registers the key press. When key 112b is not raised, key peg 128 may be in contact with key press detection means 156 but a key press will not be registered by baseplate 122 or a key press is registered by baseplate 122 but the key press is not registered, is ignored, or is otherwise disregarded by the system.

Figure 4A:
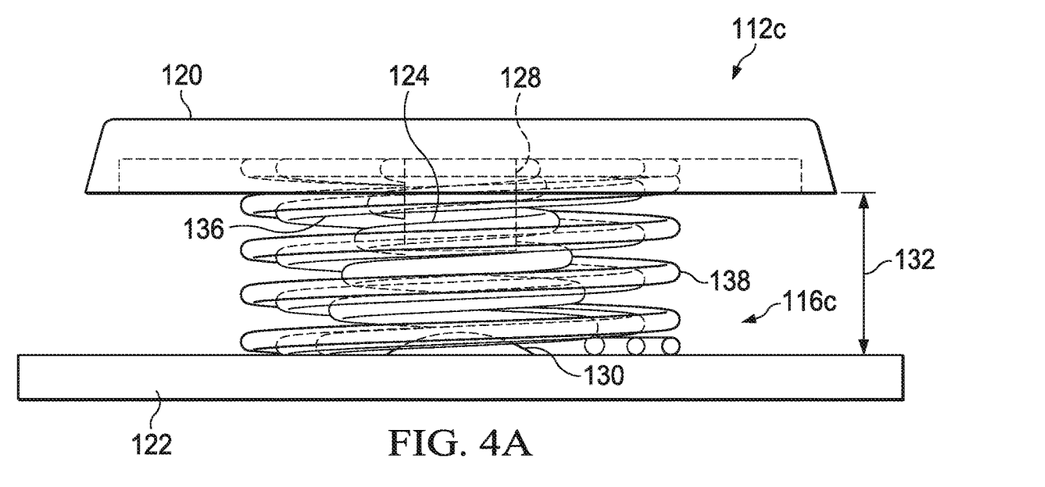
FIG. 4A is a simplified block diagram of a portion of an electronic device that includes a keyboard that includes shape memory material, in accordance with an embodiment of the present disclosure.

Turning to FIG. 4A, FIG. 4A is a simplified block diagram of a key 112c. Keyboard 110 can include one or more keys 112c. As illustrated in FIG. 4A, key 112c can include a key height mechanism 116c, keycap 120, baseplate 122, key spring 124, key peg 128, and key dome 130. Key height mechanism 116c can include a first shape memory material spring 136 and a second shape memory material spring 138. Key spring 124 can act as a keyboard actuator for tactile feedback when key 112c is pressed. When key 112c is raised and keycap 120 of key 112c is pressed, key peg 128 comes into contact with key dome 130 and the key press is registered by baseplate 122. When key 112c is not raised, key peg 128 may be in contact with key dome 130 but a key press will not be registered by baseplate 122 or a key press is registered by baseplate 122 but the key press is not registered, is ignored, or is otherwise disregarded by the system. Baseplate 122 includes the circuitry that carries the signal generated when a keypress is registered and carries the signal to activate first shape memory material spring 136, and a second shape memory material spring 138.

First shape memory material spring 136 may be fixed only at the bottom of keycap 120. Second shape memory material spring 138 may be fixed at keycap 120 and at baseplate 122. Key height activation engine 114 (not shown) can activate first shape memory material spring 136 by causing a current to be delivered to first shape memory material spring 136. The activation of first shape memory material spring 136 (by key height activation engine 114, not shown) causes first shape memory material spring 136 to expand. Because first shape memory material spring 136 is under keycap 120, when first shape memory material spring 136 is expands, key spring 124 raises keycap 120 to an active key height 132. Once key 112c is raised to active key height 132, key 122c is ready for use by a user and key height activation engine 114 (not shown) can cause the current being delivered to first shape memory material spring 136 to be deactivated. Key spring 124 can keep keycap 120 at active key height 132 during use and can act as a keyboard actuator for tactile feedback.

Figure 4B:
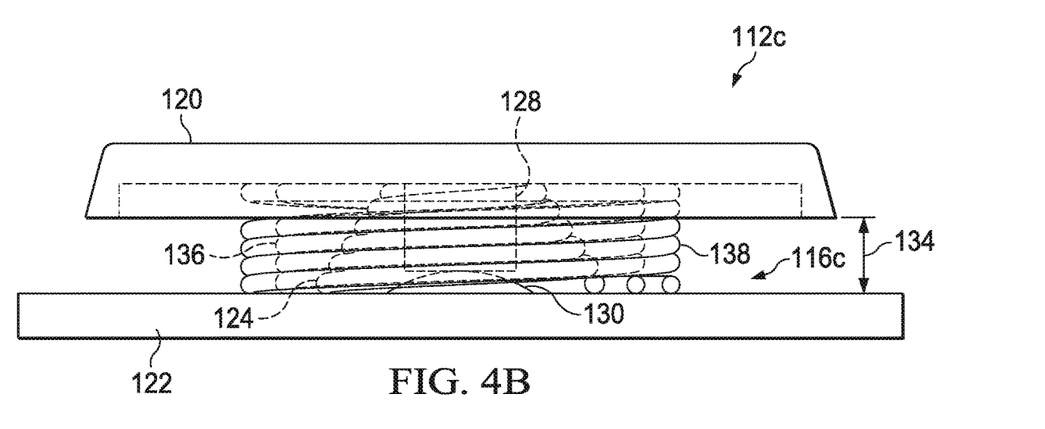
FIG. 4B is a simplified block diagram of a portion of an electronic device that includes a keyboard that includes shape memory material, in accordance with an embodiment of the present disclosure.

Turning to FIG. 4B, FIG. 4B is a simplified block diagram of key 112c. Second shape memory material spring 138 is fixed at keycap 120 and at baseplate 122. Key height activation engine 114 (not shown) can activate second shape memory material spring 138 by causing a current to be delivered to second shape memory material spring 138. When second shape memory material spring 138 is activated (by key height activation engine 114, not shown), second shape memory material spring 138 shrinks in size or collapses.

Because second shape memory material spring 138 is fixed at keycap 120 and at baseplate 122, when second shape memory material spring 138 shrinks in size or collapses, second shape memory material spring 138 pulls keycap 120 towards baseplate 122 and lowers keycap 120 to inactive key height 134. Once keycap 120 is lowered to inactive key height 134, key height activation engine can cause the current being delivered to second shape memory material spring 138 to be deactivated. In some examples, keycap 120 may be held at inactive key height 134 by a pressure fit or some mechanical or magnetic means that can hold keycap 120 at inactive key height 134 until first shape memory material spring 136 is activated and the keycap is raised.

Figure 5A:
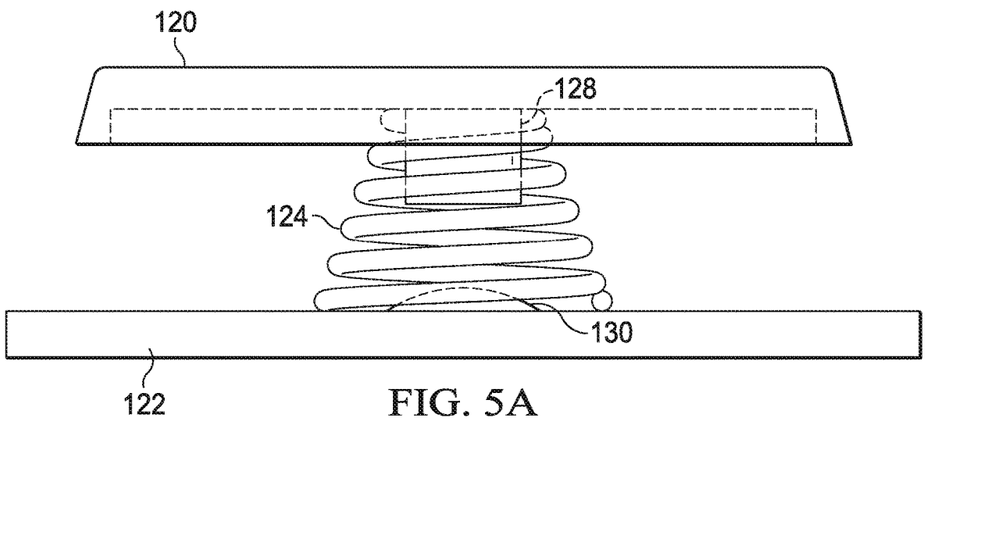
FIG. 5A is a simplified block diagram of a portion of an electronic device that includes a keyboard that includes shape memory material, in accordance with an embodiment of the present disclosure.

Turning to FIG. 5A, FIG. 5A is a simplified partial block diagram of key 112c. As illustrated in FIG. 5A, key 112c can include keycap 120, baseplate 122, key spring 124, key peg 128, and key dome 130. For clarity, first shape memory material spring 136 and second shape memory material spring 138 are not shown.

Figure 5B:
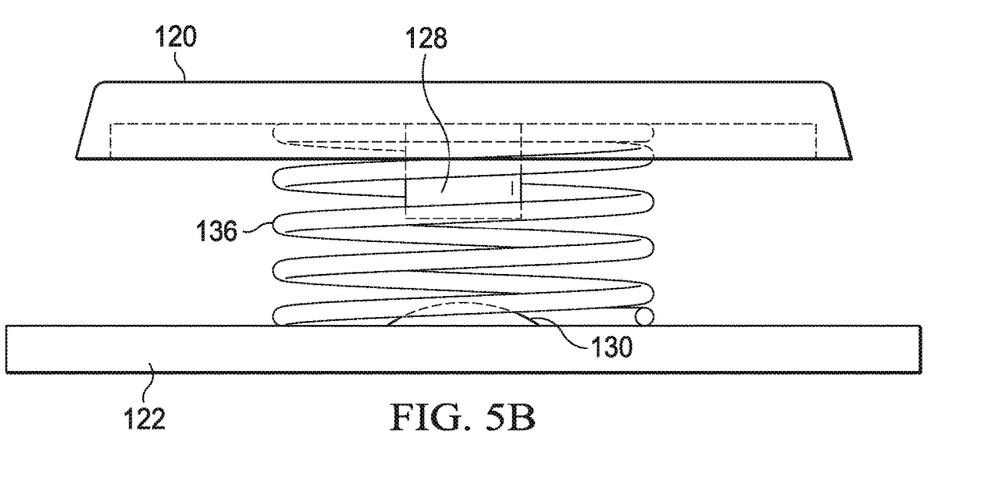
FIG. 5B is a simplified block diagram of a portion of an electronic device that includes a keyboard that includes shape memory material, in accordance with an embodiment of the present disclosure.

Turning to FIG. 5B, FIG. 5B is a simplified partial block diagram of key 112c. As illustrated in FIG. 5B, key 112c can include keycap 120, baseplate 122, key peg 128, key dome 130, and first shape memory material spring 136. For clarity, key spring 124 and second shape memory material spring 138 are not shown.

Figure 5C:
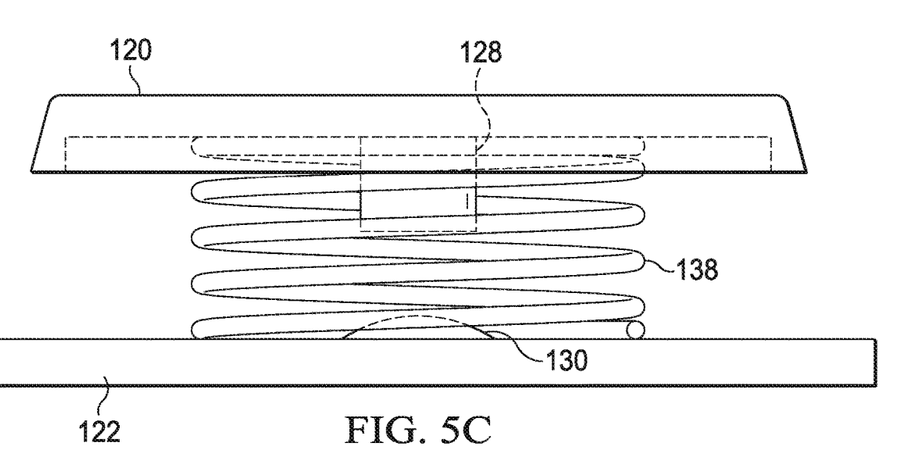
FIG. 5C is a simplified block diagram of a portion of an electronic device that includes a keyboard that includes shape memory material, in accordance with an embodiment of the present disclosure.

Turning to FIG. 5C, FIG. 5C is a simplified partial block diagram of key 112c. As illustrated in FIG. 5C, key 112c can include keycap 120, baseplate 122, key peg 128, key dome 130, and second shape memory material spring 138. For clarity, key spring 124 and first shape memory material spring 136 are not shown.

Figure 5D:
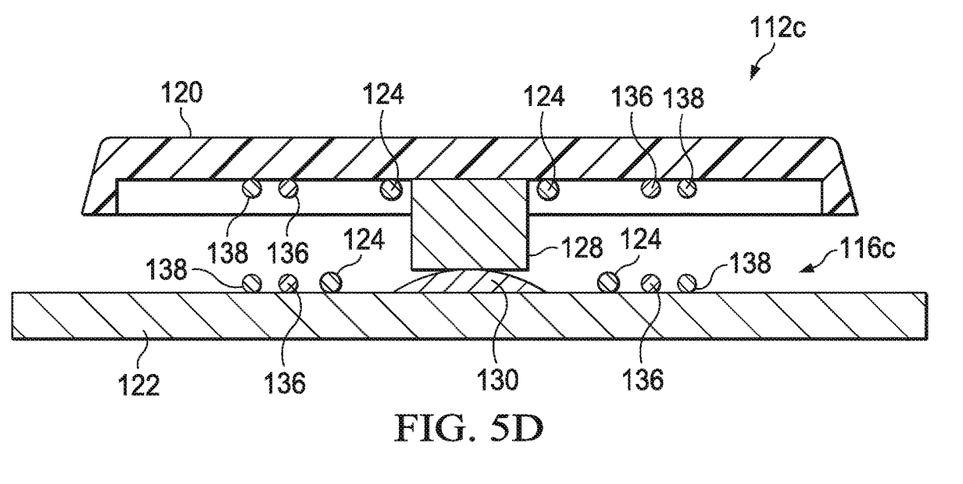
FIG. 5D is a simplified block diagram of a portion of an electronic device that includes a keyboard that includes shape memory material, in accordance with an embodiment of the present disclosure.

Turning to FIG. 5D, FIG. 5D is a simplified cut away block diagram illustrating example details of key 112c. As illustrated in FIG. 5D, key 112c can include a key height mechanism 116c, keycap 120, baseplate 122, key spring 124, key peg 128, and key dome 130. Key height mechanism 116c can include first shape memory material spring 136 and second shape memory material spring 138. Key spring 124 can act as a keyboard actuator for tactile feedback when keycap 120 of key 112c is pressed by a user.

Figure 6:
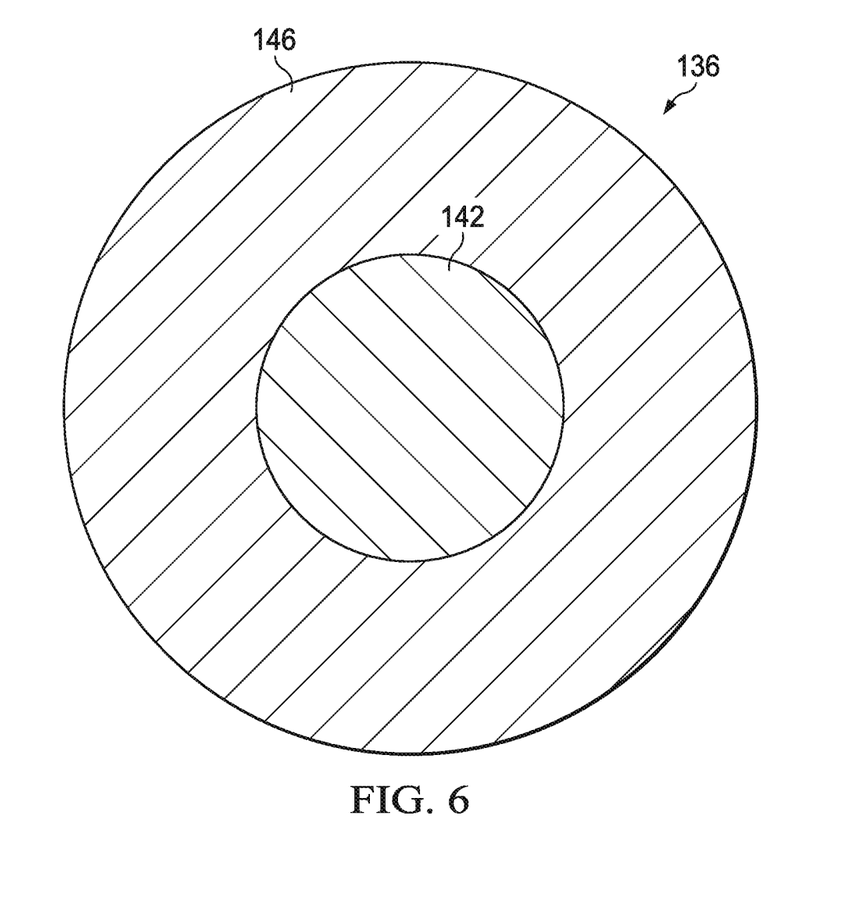
FIG. 6 is a simplified block diagram of a portion of a portion of a memory material spring for use in an electronic device that includes a keyboard that includes shape memory material, in accordance with an embodiment of the present disclosure.

Turning to FIG. 6, FIG. 6 is a simplified block diagram cross section view of first shape memory material spring 136. Note that second shape memory material spring 138 and key height mechanism 116 may have the same or similar cross section. First shape memory material spring 136 can include shape memory material 142 and a protective covering 146.

Shape memory material 142 is configured to that have the ability to return from a deformed state (temporary shape) to its original (permanent) shape when activated or induced by an external stimulus, such as a temperature change. The temperature change can be created by running a current through shape memory material 142. Protective covering 146 is configured to help insulate shape memory material 142, help prevent shape memory material 142 from being triggered by ambient temperature, help prevent electrical short circuits, help to protect shape memory material 142 against abrasions or wear, etc. Protective covering 146 may be polytetrafluoroethylene (PTFE) or some other similar material or covering that can help protect shape memory material 142. In an example, first shape memory material spring 136 may include conductive material (e.g., a conductive paste conductive paste, foam, etc.) between shape memory material 142 and protective covering 146.

Figure 7:
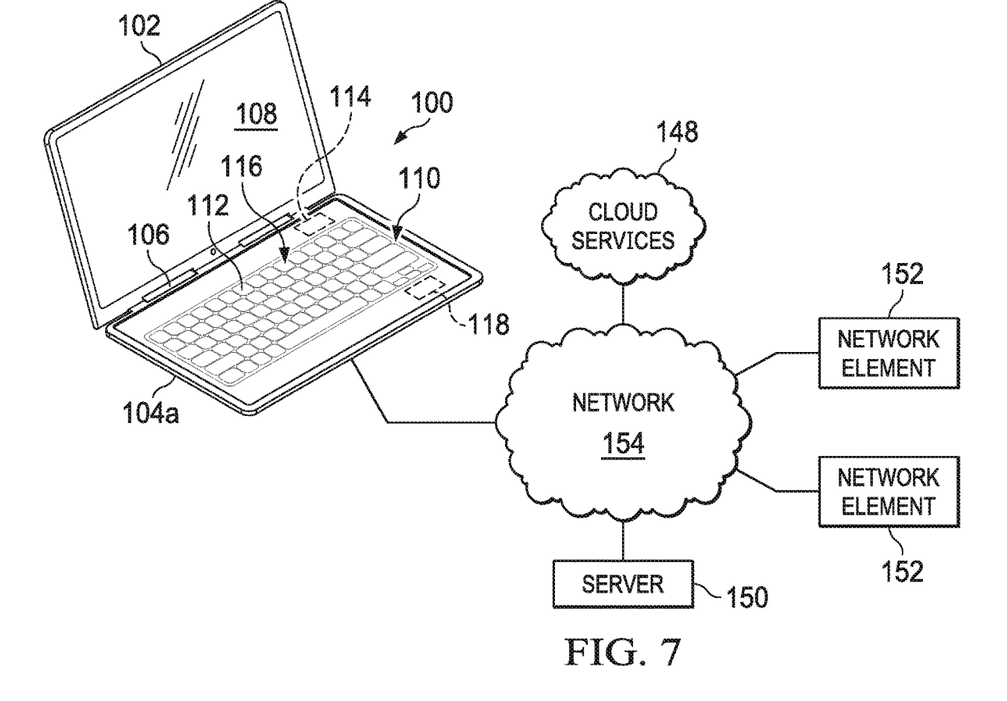
FIG. 7 is a simplified block diagram of an electronic device that includes a keyboard that includes shape memory material, in accordance with an embodiment of the present disclosure.

Turning to FIG. 7, FIG. 7 is a simplified block diagram of electronic device 100 configured with a keyboard that includes shape memory material, in accordance with an embodiment of the present disclosure. In an example, electronic device 100 can include first housing 102 and second housing 104a. A hinge 106 can rotatably couple first housing 102 to second housing 104a. First housing 102 can include display 108.

Second housing 104a can include keyboard 110. Keyboard 110 can include plurality of keys 112. One or more of plurality of keys 112 can include key height mechanism 116. Keyboard 110 can also include key height activation engine 114. In some examples, keyboard 110 may include key height activator 118. Electronic device 100 may be in communication with cloud services 148, one or more servers 150, and/or one or more network elements 152 using network 154.

Network elements of FIG. 7 may be coupled to one another through one or more interfaces employing any suitable connections (wired or wireless), which provide viable pathways for network (e.g., network 154, etc.) communications. Additionally, any one or more of these network elements of FIG. 7 may be combined or removed from the architecture based on particular configuration needs. Network 154 may include a configuration capable of transmission control protocol/Internet protocol (TCP/IP) communications for the transmission or reception of packets in a network. Electronic devices 100 may also operate in conjunction with a user datagram protocol/IP (UDP/IP) or any other suitable protocol where appropriate and based on particular needs.

Turning to the infrastructure of FIG. 7, network 154 represents a series of points or nodes of interconnected communication paths for receiving and transmitting packets of information. Network 154 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 154, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

Figure 8:
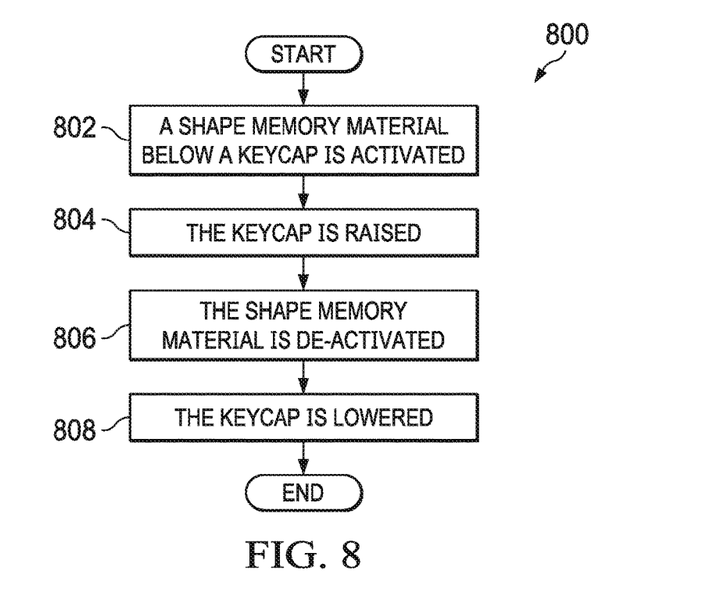
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with enabling a keyboard that includes shape memory material, in accordance with an embodiment. In an embodiment, one or more operations of flow 800 may be performed by key height activation engine 114, key height activator 118, etc. At 802, a shape memory material below a keycap is activated. For example, key height mechanism 116 or first shape memory material spring 136 may be activated by key height activation engine 114. In another example, a user may use key height activator 118 to activate key height mechanism 116 or first shape memory material spring 136. At 804, the keycap is raised. At 806, the shape memory material is de-activated. For example, key height mechanism 116 may be de-activated by key height activation engine 114 or second shape memory material spring 138 may be activated by key height activation engine 114. At 810, the keycap is lowered.

It is also important to note that the operations in the preceding flow diagram (i.e., FIG. 8) illustrates only some of the possible correlating scenarios and patterns that may be executed by, or within, electronic device 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic device 100 has been illustrated with reference to particular elements and operations, these elements and operations may be replaced by any suitable architecture, protocols, and/or processes that achieve the intended functionality of electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a key height activation engine and a keyboard. The keyboard includes a plurality of keys and one or more of the plurality of keys includes a shape memory material. When the shape memory material is activated by the key height activation engine, the shape memory material raises the one or more of the plurality of keys from a first height to a second height.

In Example A2, the subject matter of Example A1 can optionally include where the first height is less than one (1) millimeter from a baseplate of the keyboard.

In Example A3, the subject matter of any one of Examples A1-A2 can optionally include where the second height is greater than one (1) millimeter from a baseplate of the keyboard.

In Example A4, the subject matter of any one of Examples A1-A3 can optionally include a key height activator, where the key height activator causes the key height activation engine to activate the shape memory material.

In Example A5, the subject matter of any one of Examples A1-A4 can optionally include where the key height activator is a biometric scanner.

In Example A6, the subject matter of any one of Examples A1-A5 can optionally include where the electronic device is a laptop computer.

In Example A7, the subject matter of any one of Examples A1-A6 can optionally include where the shape memory material is a Nickel-Titanium alloy.

Example M1 is a method including raising a key in a keyboard of an electronic device from a first height to a second height using a key height mechanism, where the key height mechanism includes a shape memory material and lowering the key in the keyboard to the first height using the key height mechanism.

In Example M2, the subject matter of Example M1 can optionally include where the first height is less than one (1) millimeter from a baseplate of the keyboard.

In Example M3, the subject matter of any one of the Examples M1-M2 can optionally include where the second height is greater than one (1) millimeter from the baseplate of the keyboard.

In Example M4, the subject matter of any one of the Examples M1-M3 can optionally include where the key height mechanism includes a first shape memory material spring and a second shape memory material spring.

In Example M5, the subject matter of any one of the Examples M1-M4 can optionally include where the key is raised to the second height when the first shape memory material spring is activated and is lowered to the first height when the second shape memory material spring is activated.

In Example, M6, the subject matter of any one of the Examples M1-M5 can optionally include where the electronic device is a laptop computer.

In Example, M7, the subject matter of any one of the Examples M1-M6 can optionally include where the shape memory material is a is Nickel-Titanium alloy.

Example K1 is a keyboard. The keyboard can include a key height activation engine, a plurality of keys, and a key height mechanism located in one or more of the plurality of keys. The key height mechanism includes a shape memory material. When the key height mechanism is activated by the key height activation engine, the shape memory material raises the one or more of the plurality of keys that includes the key height mechanism from a first height to a second height.

In Example K2, the subject matter of Example K1 can optionally include where the first height is less than one (1) millimeter from a baseplate of the keyboard.

In Example K3, the subject matter of any one of the Examples K1-K2 can optionally include where the second height is greater than one (1) millimeter from the baseplate of the keyboard.

In Example K4, the subject matter of any one of the Examples K1-K3 can optionally include a key height activator, where the key height activator causes the key height activation engine to activate the key height mechanism.

In Example K5, the subject matter of any one of the Examples K1-K4 can optionally include where the key height activator is a biometric scanner.

In Example K6, the subject matter of any one of the Examples K1-K5 can optionally include where the shape memory material is a is Nickel-Titanium alloy.

Example AA1 is an apparatus including means for raising a key in a keyboard of an electronic device from a first height to a second height using a key height mechanism, where the key height mechanism includes a shape memory material means for lowering the key in the keyboard to the first height using the key height mechanism.

In Example AA2, the subject matter of Example AA1 can optionally include where the first height is less than one (1) millimeter from a baseplate of the keyboard.

In Example AA3, the subject matter of any one of Examples AA1-AA2 can optionally include where the second height is greater than one (1) millimeter from the baseplate of the keyboard.

In Example AA4, the subject matter of any one of Examples AA1-AA3 can optionally include where the key height mechanism includes a first shape memory material spring and a second shape memory material spring.

In Example AA5, the subject matter of any one of Examples AA1-AA4 can optionally include where the key is raised to the second height when the first shape memory material spring is activated and is lowered to the first height when the second shape memory material spring is activated.

In Example AA6, the subject matter of any one of Examples AA1-AA5 can optionally include where the electronic device is a laptop computer.

In Example AA7, the subject matter of any one of Examples AA1-AA6 can optionally include where the shape memory material is a is Nickel-Titanium alloy.

Example X1 is a machine-readable storage medium including machine-readable instructions to implement a method or realize an apparatus as in any one of the Examples A1-A7, AA1-AA7, or M1-M7. Example Y1 is an apparatus comprising means for performing any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
   a key height activation engine; and
   a keyboard, wherein the keyboard includes a plurality of keys and one or more of the plurality of keys includes a key dome and a shape memory material, wherein when the shape memory material is not activated by the key height activation engine, the shape memory material has a first shape memory material height that is below the key dome and when the shape memory material is activated by the key height activation engine, the shape memory material has a second shape memory material height that is above the key dome and the shape memory material raises the one or more of the plurality of keys from a first height to a second height.

2. The electronic device of claim 1, wherein the first height is less than one (1) millimeter from a baseplate of the keyboard.

3. The electronic device of claim 1, wherein the second height is greater than one (1) millimeter from a baseplate of the keyboard.

4. The electronic device of claim 1, further comprising:
   a key height activator, wherein the key height activator causes the key height activation engine to activate the shape memory material.

5. The electronic device of claim 4, wherein the key height activator is a biometric scanner.

6. The electronic device of claim 1, wherein the electronic device is a laptop computer.

7. The electronic device of claim 1, wherein the shape memory material is a Nickel-Titanium alloy.

8. A method comprising:
   raising a key in a keyboard of an electronic device from a first height to a second height using a key height mechanism, wherein the key includes a key dome and the key height mechanism includes a shape memory material, wherein when the shape memory material is not activated, the shape memory material has a first shape memory material height that is below the key dome and when the shape memory material is activated, the shape memory material has a second shape memory material height that is above the key dome; and
   lowering the key in the keyboard to the first height using the key height mechanism.

9. The method of claim 8, wherein the first height is less than one (1) millimeter from a baseplate of the keyboard.

10. The method of claim 9, wherein the second height is greater than one (1) millimeter from the baseplate of the keyboard.

11. The method of claim 8, wherein the key height mechanism includes a first shape memory material spring and a second shape memory material spring.

12. The method of claim 11, wherein the key is raised to the second height when the first shape memory material spring is activated and is lowered to the first height when the second shape memory material spring is activated.

13. The method of claim 8, wherein the electronic device is a laptop computer.

14. The method of claim 8, wherein the shape memory material is a is Nickel-Titanium alloy.

15. A keyboard comprising:
    a key height activation engine;
    a plurality of keys, wherein each of the plurality of keys includes a key dome; and
    a key height mechanism located in one or more of the plurality of keys, wherein the key height mechanism includes a shape memory material, wherein when the shape memory material is not activated by the key height activation engine, the shape memory material has a first shape memory material height that is below the key dome and when the key height mechanism is activated by the key height activation engine, the shape memory material has a second shape memory material height that is above the key dome and the shape memory material raises the one or more of the plurality of keys that includes the key height mechanism from a first height to a second height.

16. The keyboard of claim 15, wherein the first height is less than one (1) millimeter from a baseplate of the keyboard.

17. The keyboard of claim 16, wherein the second height is greater than one (1) millimeter from the baseplate of the keyboard.

18. The keyboard of claim 15, further comprising:
    a key height activator, wherein the key height activator causes the key height activation engine to activate the key height mechanism.

19. The keyboard of claim 18, wherein the key height activator is a biometric scanner.

20. The keyboard of claim 15, wherein the shape memory material is a is Nickel-Titanium alloy.

\* \* \* \* \*

UNITED STATES PATENT AND TRADEMARK OFFICE
CERTIFICATE OF CORRECTION

| | | |
|---|---|---|
| PATENT NO. | : 11,551,891 B2 | |
| APPLICATION NO. | : 16/455576 | |
| DATED | : January 10, 2023 | |
| INVENTOR(S) | : Prakash Kurma Raju et al. | |

It is certified that error appears in the above-identified patent and that said Letters Patent is hereby corrected as shown below:

In the Claims

In Column 16, Claim 14, Line 58, delete "is a is" and insert -- is a --, therefor.

In Column 17, Claim 20, Line 22, delete "is a is" and insert -- is a --, therefor.

Signed and Sealed this
Twenty-eighth Day of February, 2023

Katherine Kelly Vidal
*Director of the United States Patent and Trademark Office*